(12) United States Patent
Schmitz

(10) Patent No.: US 6,790,544 B2
(45) Date of Patent: Sep. 14, 2004

(54) MULTIPLE LAYER COMPOSITE MATERIAL CONSISTING OF CEMENT-BOUND CONCRETE AND POLYMER-BOUND CONCRETE AND METHOD FOR PRODUCING THE SAME

(75) Inventor: Michael Schmitz, Rheinmunster (DE)

(73) Assignee: F. Von Langsdorff Licensing Limited, Ingelwood (CA)

( * ) Notice: Subject to any disclaimer, the term of this patent is extended or adjusted under 35 U.S.C. 154(b) by 18 days.

(21) Appl. No.: 10/097,352

(22) Filed: Mar. 15, 2002

(65) Prior Publication Data

US 2002/0152711 A1 Oct. 24, 2002

Related U.S. Application Data

(63) Continuation of application No. PCT/EP00/09002, filed on Sep. 14, 2000.

(30) Foreign Application Priority Data

Sep. 15, 1999 (DE) .......................................... 199 44 307

(51) Int. Cl.$^7$ ......................... C04B 40/06; C04B 26/02; E01C 5/06; E04C 2/04
(52) U.S. Cl. ...................... 428/703; 52/612; 52/309.12; 52/309.17; 404/34
(58) Field of Search ........................... 428/703; 52/612, 52/309.12, 309.17; 404/34

(56) References Cited

U.S. PATENT DOCUMENTS

| | | | |
|---|---|---|---|
| 3,439,076 A | | 4/1969 | Loois |
| 4,044,520 A | * | 8/1977 | Barrows |
| 4,339,289 A | * | 7/1982 | Lankard |
| 4,944,127 A | * | 7/1990 | Clear |
| 5,788,407 A | * | 8/1998 | Hwang |
| 5,797,238 A | * | 8/1998 | Berntsson et al. |
| 5,843,554 A | * | 12/1998 | Katz |
| 2002/0192510 A1 | * | 12/2002 | Najji et al. |

FOREIGN PATENT DOCUMENTS

| | | | |
|---|---|---|---|
| DE | 2006522 | 8/1971 | |
| DE | 29622732 | 4/1997 | |
| JP | 2000-319811 | * 11/2000 | ........... E01C/11/24 |
| JP | 2001-164502 | * 6/2001 | ............. E01C/5/06 |

OTHER PUBLICATIONS

Patent Abstracts of Japan, vol. 018, No. 679, (M–1728), Dec. 21, 1994, & JP 06 270111 A (Misawa Ceramics KK), Sep. 27, 1994.
Patent Abstracts of Japan, vol. 1996, No. 12, Dec. 26, 1996, & JP 08 208355 A (Geostr Corp), Aug. 13, 1996.

* cited by examiner

Primary Examiner—Robert Canfield
(74) Attorney, Agent, or Firm—Dowell & Dowell, P.C.

(57) ABSTRACT

The present invention relates to a multiple layer composite material and to a method for producing the same. Said multiple layer composite material has at least one layer of cement-bound concrete and at least one layer of polymer-bound concrete. The transition between adjacent layers of cement-bound concrete and polymer-bound concrete has at least the material strength of the less stable one of the concrete layers adjoining the transition. The layer of polymer-bound concrete allows the diffusion of water vapor, but does not allow liquid water to penetrate. The multiple layer composite material can be produced completely in an aqueous system.

14 Claims, 1 Drawing Sheet

MULTIPLE LAYER COMPOSITE MATERIAL CONSISTING OF CEMENT-BOUND CONCRETE AND POLYMER-BOUND CONCRETE AND METHOD FOR PRODUCING THE SAME

This application is a Continuation of PCT application number PCT/EP00/09002, filed on Sep. 14, 2000.

BACKGROUND OF THE INVENTION

1. Field of the Invention

The present invention relates to a multiple layer composite material comprising at least one layer of cement-bound core concrete and at least one layer of polymer-bound facing concrete, a method for producing the same and to shaped bodies made of said multiple layer composite material.

2. Description of the Prior Art

Concrete is an artificial stone material created by a mixture of cement, concrete aggregate and water, optionally with concrete admixtures and concrete additives, by solidification thereof. Curing is effected by the binding agent cement that sets with the use of water under normal conditions, with a solid body being formed from the pulpy concrete mixture. Possible concrete aggregate, concrete admixtures and concrete additives are mineral as well non-mineral materials of specific sizes (grain gradation). For cement-bound concretes, there have been available, for decades, findings and experience on material features, material composition, material production, material shaping as well as the material behavior both in the fresh and in the cured state. The combined action of cement qualities, aggregates as well as the grain gradation thereof, and of filler materials and other additives as well as the addition of water is known.

Cement-bound concrete is used as building material for example for construction components manufactured in situ or in industrial production, for ready-made concrete parts, such as concrete pipes or concrete ducts, for cladding panels or for paving or plate-like covering elements of concrete, for grass-growing fortification elements or water-permeable pavings.

However, cement-bound concrete has a number of disadvantages: for example, it tends to form efflorescence (of calcium carbonate) or allows water to penetrate the pore structure. For paving or plate-like covering elements of concrete utilized outside, this means that cracks are formed by freezing water in case of frost, which will lead to destruction of the elements in the course of time. Thawing salt used for eliminating ice may enter the plates together with melting water and accelerate their destruction. Due to the porous structure of the surfaces of such coverings, dirt adheres easily thereon, thereby restricting the possibilities of use thereof in areas in which major dirt accumulation is to be expected, such as in goods transshipment areas, industrial filling areas, open-air gastronomy.

For improving the processing properties and properties of use of concrete, materials have been developed in which the usual binder concrete is replaced completely or in part by binder on the basis of synthetic resins, so-called polymer concrete. Suitable binders are, for example, epoxy resin systems, polyurethane resin systems and polyester resin systems.

As compared to conventional cement-bound concrete, polymer-bound concrete has a number of advantages. In particular, it displays higher resistance to chemicals, tends less to dirt adhesion and shows no efflorescence. The mechanical properties of polymer concrete are basically satisfactory as well, such as the slenderness of concrete components made of such concrete, for example polyester concrete channels or polyester concrete pipes.

However, polymer-bound concrete is considerably more expensive to manufacture than cement-bound concrete. Thus, endeavors are made to keep the amount of polymer concrete used as low as possible. However, it is also possible and completely sufficient that a shaped part made of concrete, for example a paving stone or a cladding panel, has only its top side made of polymer concrete.

There are known composite elements in which a prefabricated layer of cement-bound concrete has an also prefabricated layer of polymer-bound concrete adhered thereto. These elements cannot be manufactured in one pass and necessitate expensive special adhesive.

It is also known to form a paving stone as a composite construction of so-called core concrete and facing concrete. The core concrete is cement-bound concrete and the covering layer applied thereto, i.e. the facing concrete, is polymer-bound concrete. These composite elements are manufactured, for example, by first introducing the core concrete mixture, which contains cement as binder, into a mold box of a stone molding machine and then applying the facing concrete mixture, which contains polymer as binder, onto the core concrete mixture. This results in a composite element having a supporting layer of cement-bound core concrete and a usually relative thin covering layer of polymer-bound facing concrete. The properties of the composite element are determined in essence by the covering layer so that only the polymer-bound facing concrete has to fulfill the majority of the requirements to be met by the particular product.

A serious disadvantage of the known paving stones of core concrete and facing concrete consists in that the connection between facing concrete and core concrete is weaker than the bond within the core concrete layer and within the facing concrete layer, respectively. In addition thereto, the known facing concretes have a porous grain structure in which the bond between the aggregate bodies often is created in punctiform fashion only, i.e. there are often materials of quite single-grain gradation adhered to each other at their points of contact. This porous grain structure permits the penetration of water and possibly the penetration of salty solutions during winter. The penetrated water may freeze and cause cracks in the material. In the worst case, the facing concrete layer may chip off from the core concrete layer. The resistance to freeze-thaw cycling of the known paving stones is thus of inferior quality. In addition thereto, the abrasive strength of the porous polymer-bound facing concretes is weak since individual aggregate particles are rapidly torn out of the grain structure if the material is subjected to higher loads, e.g. by being driven on.

SUMMARY OF THE INVENTION

It is therefore an object of the present invention to make available a composite material of cement-bound core concrete and polymer-bound facing concrete which overcomes the afore-mentioned disadvantages. In particular, the composite material is to be capable of taking up stresses induced by temperature fluctuations without being damaged and display resistance to freeze-thaw cycling.

Preferably, the composite material also is to be capable of taking up static and dynamic loads, such as "installation stress" and loads created by being walked on or driven on, without being damaged thereby. Preferably, the composite material also displays resistance to light, in particular UV light, and of course also has the positive properties known with respect to polymer concrete according to the prior art, such as chemical resistance.

Another object of the invention consists in making available shaped bodies of the composite material according to the invention. Such shaped bodies may be e.g. ready-made concrete parts, concrete paving stones or concrete slabs.

An additional object of the present invention consists in making available a method for producing a composite material of cement-bound core concrete and polymer-bound facing concrete. The method is to be suitable to be carried out fully on conventional manufacturing lines for cement-bound concrete, without requiring adaptation measures that are complex in terms of machine technology. Increased demands on the production facilities are to be avoided.

The object is met by the multiple layer composite material comprising at least one layer of a cement-bound concrete, at least one layer of a polymer-bound concrete and a transition between adjacent layers of cement-bound concrete and polymer-bound concrete, wherein the transition has at least the material strength of the less stable one of the adjacent layers, the layer of polymer-bound concrete has a grain structure preventing the passage of liquid water to the transition, but permitting the escape of water, preferably of water in the form of vapor only, from the material, and that the layer of polymer-bound concrete is composed of concrete aggregate, if desired concrete admixtures and/or concrete additives, and of at least one polymer, said at least one polymer or the components of the polymer, in the uncured state, being dispersible in water.

The inventive method for producing the multiple layer composite material, comprising at least one layer of cement-bound concrete, at least one layer of polymer-bound concrete and a transition between adjacent layers of cement-bound concrete and polymer-bound concrete, is characterized by the steps of making at least one concrete mixture containing cement as binder, making at least one concrete mixture containing polymer as binder, with said polymer or the components of said polymer, in the uncured state, being dispersible in water, supplying the concrete mixtures separately and applying them directly on each other so as to form at least one layer of polymer-bound concrete on at least one layer of cement-bound concrete, with the concrete mixture containing cement as binder, at least at the transition between adjacent layers of cement-bound concrete mixture and polymer-bound concrete mixture, containing less water than the amount of water necessary for setting.

A "polymer dispersible in water in the uncured state" is to be understood in the present context to comprise also polymer pre-products or pre-components dispersible in water, for example oligomeric or polymeric compounds that are dispersible in water and are capable of reacting with cross-linkage or additional polymerization and cross-linkage. These polymers or polymer components, after curing, constitute the binder for the polymer-bound concrete.

The shaped body according to the invention that is produced from the multiple layer composite material is provided on at least one surface with at least one layer of polymer-bound concrete.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
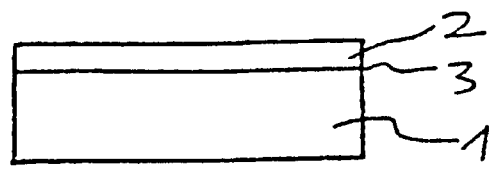
FIG. 1 shows a cross-sectional view of a concrete slab of multiple layer composite material according to the invention.

The multiple layer composite material according to the invention comprises at least one layer of cement-bound concrete, namely the core concrete layer, and at least one layer of polymer-bound concrete, namely the facing concrete layer. The multiple layer composite material according to the invention is wherein the transition between core concrete layer and polymer concrete layer has at least the material strength of the less stable one of the adjacent layers and that the facing concrete layer has a grain structure preventing the passage of liquid water to the transition, and preferably largely preventing the penetration of liquid water, but permitting the escape of water present in the facing concrete layer or the diffusion of water coming from the core concrete. The water escapes in gaseous form, i.e. in the form of water vapor.

The method for producing the multiple layer composite material according to the invention comprises the following steps: making at least one concrete mixture containing cement as binder and making at least one concrete mixture containing polymer as binder separately from each other and then feeding the same to each other such that a layer structure comprising at least two layers is formed, i.e. at least one layer of cement-bound concrete and at least one layer of polymer-bound concrete. With such a layering, there is formed a transition area between a layer of cement-bound concrete and a layer of polymer-bound concrete. This transition between layers with different binders constitutes a weak point in conventional paving stones. The strength of the bond between the polymer-bound facing concrete and the cement-bound core concrete often is less than the strength of the bond within the layer of polymer-bound facing concrete and within the layer of cement-bound core concrete, respectively, in particular when the shaped body is produced in one pass only. According to the invention, this problem is solved in that less water is added to the concrete mixture containing cement as binder than would be necessary for complete setting. In case of a thicker core concrete layer, it is sufficient that this water shortage is present in the region adjoining the facing concrete layer. During curing of the polymer in the facing concrete layer, water is set free. This water transgresses the interface to the core concrete layer and renders possible complete setting of the cement-bound concrete. In addition thereto, polymer dispersed in the water or dispersed polymer constituents are dragged into the region of the core concrete layer adjoining the facing concrete layer so that a polymer/cement mixed matrix is present at the transition between these two layers. Thus, there is created a bond in the contacting region which reaches at least the strength of the less stable one of the adjacent concretes, and in most cases, the strength of the bond surprisingly reaches or even exceeds the material strength of the more stable one of the adjacent concretes. Due to this matching of the water management of adjacent cement-bound concrete layer and polymer-bound concrete layer with respect to each other, breakage in the transition or the contact layer is reliably avoided. When subjected to tensile load perpendicular to the layers, there is actually no cracking caused at the transition, but rather, cracking is caused as a rule in the core concrete.

The method is carried out completely in the aqueous system, i.e. the uncured materials are all present in aqueous phase. Therefore, it is possible in producing the multiple layer composite material according to the invention to make use of common production processes as usual for the production of cement-bound concrete (board-type fabrication means or slab press). The use of organic solvents is not necessary.

Shaped bodies of cement-bound concrete are typically produced by mixing of the constituent parts cement, concrete aggregate, water and optionally additional constituents such as e.g. concrete admixtures and concrete additives, in a mixing container. The fresh concrete is transported to the molding machine, introduced into a mold, unmolded after shaping, and the shaped body thus formed is first transported in the "green" state to a storage site where it is allowed to cure.

Shaped bodies according to the invention are produced in completely analogous manner, with the sole exception that not only one, but two concretes are made, one thereof containing, instead of cement, a polymer or polymer-forming components as binder. The individual concretes are made in separate mixing containers and transported to the stone molding machine separately. The latter has at least two feed stations, namely for the core concrete mixture and for the facing concrete mixture. Upon supplying material to these feed stations, the stone molding machine processes the materials by suitable volume control, by introducing the different types of concrete into different superimposed concrete voids, with the upper concrete void being formed by filling of the lower concrete void and with the core concrete as a rule taking the lower, larger space and the facing concrete, which is applied directly onto the core concrete, forming a comparatively thin covering layer, preferably about 5 to 30% of the total thickness of the shaped body. The surface of the facing concrete layer constitutes the surface of the shaped body. Thereafter, the shaped body is unmolded in the usual manner and transported to a storage site provided therefor. The entire production line is based on an aqueous system in consistence with the method.

A particularly good bond between the layers is obtained when the materials are compacted in the stone molding machine, as it is also carried out frequently in case of shaped bodies consisting of cement-bound concrete only. However, the compaction is not cogent. For example, if large coherent areas, such as a flat roof, are to be made of the multiple layer composite material according to the invention, the polymer concrete layer may be applied simply onto the still moist, not yet cured core concrete, for example by spray-coating followed by spreading.

Shaped bodies of the composite material according to the invention may be provided with a polymer concrete facing layer on one or more outer surfaces. The layers may extend parallel to each other or have any arbitrary other shape. With a curbstone, for example, it is advisable to apply a polymer concrete coating to those areas that are located outside after installation. The coating typically is carried out such that a shaped body of core concrete is made and compacted in a mold box, and the space remaining after such compaction is cast with polymer concrete. Thereafter, unmolding takes place in the usual manner.

If very thick core concrete layers are necessary, for example in case of supporting elements or elements subjected to high loads, it may be advantageous to form the core concrete layer as a double layer. In that event, there are preferably made two different core concrete mixtures, with one core concrete mixture containing the amount of water necessary for setting. This core concrete mixture is used for making the lowermost layer of the multiple layer composite material. Applied directly on this layer, in the still fresh state thereof, is the core concrete mixture that is "too dry" for complete setting. This layer in turn has the the polymer concrete layer applied thereto.

If desired, the polymer concrete layer may be composed of several layers of polymer concrete of different compositions as well. This may be advantageous, for example, if a specific surface structure or consistency is to be achieved for which very expensive materials have to be employed.

The layer or layers of core concrete is (are) made of conventional cement-bound concrete. The material composition is selected in accordance with the intended use, as is generally known in this field. The cement-bound concrete according to the invention differs from cement-bound concretes of the prior art merely in so far as the region provided for connection to the polymer-bound concrete contains less water than the amount of water necessary for complete setting.

The facing concrete contains, instead of cement, polymer-forming components or a polymer or a mixture of various polymers as binder. The binder or the polymer-forming components must be adapted to be dispersed, preferably emulsified, in water. A polymer-water ratio in the range from 1:0.7 to 0.7:1 is preferred, with 1:1 being particularly preferred. A higher content of water is unfavorable in so far as it would render the concrete watery. The polymer should not cure too quickly to permit processing thereof without problem. However, curing of the polymeric binder must not take too much time, either, i.e. the polymer should split off most of the water preferably within a period of from approx. 30 to 90 minutes. Water that cannot be split off during the liquid phase, may partly be deposited, i.e. firmly bonded, to the polymer matrix formed in the facing concrete during curing, and partly may escape from the facing concrete in the form of vapor.

Preferably, a polymeric binder is employed which, in the cured state, has high affinity to oxidic surfaces so that the aggregate and other concrete additives are bound reliably and in permanently adhering manner and cannot detach from the polymer concrete in case the material is subjected to mechanical loads.

Suitable polymeric binders are polymers adapted to be emulsified or suspended in water, such as reaction resins, e.g. epoxy resins, methacrylate resins, unsaturated polyester resins, isocyanate resins and phenacrylate resins. If the polymers are in the from of two-component resin systems, it is possible to use systems of mixtures of constituents that are reactive under application conditions only, e.g. liquid epoxy resins having encapsulated amines dispersed therein. It is also possible to employ systems in which monomer/oligomer and curing agent start to react with each other as soon as they are brought together. In case of a very rapid reaction, it may be advantageous in this case to make polymer concrete pre-mixtures, with one pre-mixture containing only the monomer/oligomer component and the other pre-mixture containing only the curing agent component. The two pre-mixtures then are mixed with each other immediately prior to application thereof on the core concrete layer.

A preferred resin system is a polyamine epoxy resin adduct and a mixture of bisphenol-A-epichlorohydrin resin, p-tert. butylphenyl glycidyl ether and benzyl alcohol.

For making the polymer-bound concrete, the polymer or a polymer mixture or the polymer-forming components are emulsified or suspended in water, preferably in a ratio of 1:1, and mixed with the concrete aggregate. If desired, additional conventional solid bodies may be admixed, such as concrete admixtures, concrete additives, fillers, dying substances. If the polymer has not sufficient UV stability itself, it is recommendable to admix UV stabilizers.

The grain sizes of the aggregate and other additives should be selected so as to provide on the one hand an as large as possible adhesion area with the resin matrix and on the other band a dense grain structure. The total capillary pore volume of the layer of polymer-bound facing concrete is preferably not more than 6% by volume, with not more than 4% by volume being particularly preferred. It is especially preferred that there are substantially only air pores present. The dense grain structure in essence with air pores only has the effect that the facing concrete layer acts like a unidirectional membrane, i.e. the penetration of liquid water from outside into the facing concrete is largely prevented, whereas the water already present in the facing concrete, e.g. water from the manufacturing process of the polymer concrete, excess water from the polymerization reaction that is neither consumed for setting of the core concrete nor bound in the polymer matrix, may escape in the form of vapor. If, in contrast thereto, the core concrete should have taken up water, for example by installation thereof as a paving stone, the inner vapor pressure can be taken up by the other layer without damage and may slowly be dissipated to the outside again, without chipping off of the facing layer from the supporting layer being caused. The multiple layer composite material according to the invention thus is excellently suited in particular for all applications in which the material is subjected to mechanical loads in conjunction with effects of moisture. The multiple layer composite material also excellently withstands effects of moisture in connection with frequent freezing/thawing temperature fluctuations, since on the one hand little or no water can penetrate the polymer concrete facing layer and on the other hand water that possibly has penetrated after all may escape again in the form of vapor without any problem.

It is possible to apply on the polymer concrete facing layer an additional polymer layer that is compatible with the material of the facing layer, for example if a particularly smooth surface structure or an additional sealing effect is desired. As material of such an additional covering layer, the same polymer or polymer mixture may be used that is used as binder in the polymer concrete facing layer, but it is also possible to use an arbitrary other polymer that is compatible with the material of the facing layer. The additional covering layer may be applied substantially at an arbitrary time, i.e. prior to curing, during curing or also after curing of the multiple layer composite material. The manner of application is dependent upon the polymer utilized. For example, the polymer may be dissolved or dispersed in water or a solvent and may then be applied by spray-coating or brush-coating. The additional covering layer may consist of polymeric material only, but it is also possible to use a filled polymer, i.e. the polymer covering layer may contain usual fillers.

As an alternative to the description given thus far, it is also possible in case of plural facing concrete layers to form the multiple layer composite material such that only the uppermost layer has a grain structure preventing the passage of liquid water, whereas the facing concrete layer(s) located underneath allow also liquid water to pass.

In the following, preferred embodiments of the multiple layer composite material according to the invention will be explained in more detail by way of shaped bodies formed therefrom:

FIG. 1 shows a cross-sectional view of a concrete slab of composite material according to the invention. The concrete slab consists of a supporting core concrete layer 1 of cement-bound concrete and of a covering layer of polymer-bound concrete, viz. the facing concrete layer 2. The core concrete layer 1, at least in the region adjoining the facing concrete layer 2, has a water shortage, i.e. it contains less water than the amount of water necessary for complete setting. This water shortage is compensated by water from the facing concrete layer 2 that diffuses into the core concrete layer 1 while taking along polymer or polymer constituents dispersed therein, with a permanent joint being formed at the transition 3 between core concrete layer and facing concrete layer.

Such slabs or other shaped bodies according to the invention may also comprise several superimposed core concrete layers and/or several superimposed facing concrete layers. In case of shaped bodies with several core concrete layers, it is sufficient that the core concrete layer in direct contact with the facing concrete layer has a water shortage. If there are several facing concrete layers applied, these may have different polymers as binders and/or different structural densities.

Figure 2:
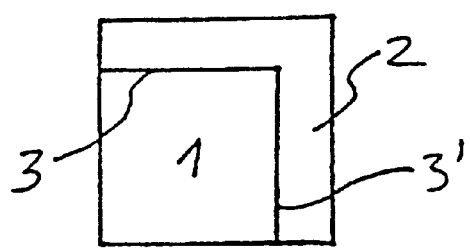
FIG. 2 shows a cross-sectional view of a curbstone of multiple layer composite material according to the invention.

FIG. 2 illustrates a curbstone in a cross-sectional view. The supporting part of the curbstone is constituted by the core concrete layer 1 of conventional cement-bound concrete. On two sides, namely on the sides located outside after installation of the curbstone, the core concrete layer is provided with a facing concrete layer of polymer concrete, with the transitions 3 and 3' between core concrete and facing concrete providing for a lasting connection between the two concrete layers.

Figure 3:
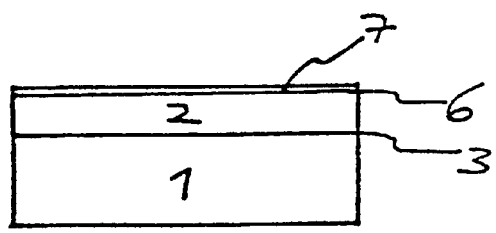
FIG. 3 shows a cross-sectional view of a concrete slab of multiple layer composite material according to the invention, comprising a core concrete layer, a facing concrete layer and a polymer covering layer.

FIG. 3 shows a cross-sectional view of a shaped body of multiple layer composite material according to the invention, in which a thin layer or film 7 on polymer basis is provided on the surface 6 of facing concrete layer 2. The polymer layer 7 may serve as a protection or sealing means for the facing concrete layer. It may contain fillers and impart special optical effects to the surface of the multiple layer composite material.

Figure 4:
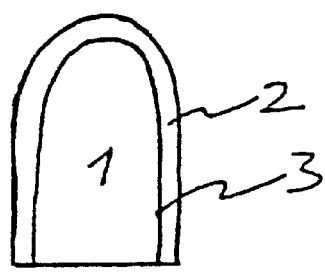
FIG. 4 shows a cross-sectional view of a bollard of multiple layer composite material according to the invention.

FIG. 4 shows a cross-sectional view of a bollard. Applied to the core concrete 1 is a softer and thus damage-reducing facing concrete layer 2 in a manner enclosing the core concrete. It can be seen from FIG. 4 that the transition 3 between the layers with different binders need not be planar, but may basically take any shape.

The multiple layer composite material according to the invention is not only usable for individual shaped bodies, but is suitable for large-area application as well. Exemplary applications are flat roofs of concrete, having an external polymer concrete layer as moisture seal, or walls, e.g. cellar walls, sealed on the outside by a polymer concrete layer. The polymer concrete layer with the grain structure according to the invention indeed prevents the penetration of water from outside into the walls, but permits the diffusion of water vapor, i.e. the walls are capable of "breathing".

As pointed out hereinbefore, the multiple layer composite material according to the invention has a number of advantages: as it works completely in the aqueous system, it is possible to employ conventional production techniques. The multiple layer composite material can be produced at low costs since polymer concrete needs to be used in a minor amount only. At the same time, however, the surface properties of the composite material are determined by the covering layer of polymer concrete. The joint between core concrete and polymer concrete is a lasting one, even if the composite material is subjected to strong static or dynamic loads, stresses by temperature fluctuations or very wet conditions. The composite material displays weathering resistance and is resistant to pressure and abrasion. In addition thereto, the composite material, due to its covering layer of polymer concrete, displays increased resistance to chemicals and resistance to adhesion of dirt and allows the design of interesting surface decors.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A multiple layer composite material comprising at least one layer of a cement-bound concrete (1), at least one layer of a polymer-bound concrete (2) and a transition (3) between adjacent layers of cement-bound concrete and polymer-bound concrete, wherein the transition (3) has at least the material strength of the less stable one of the adjacent layers (1, 2), the layer of polymer-bound concrete (2) has a grain structure preventing the passage of liquid water to the transition (3), but permitting the escape of water from the material, and that the layer of polymer-bound concrete (2) is composed of concrete aggregate and of at least one polymer, said at least one polymer or the components of the polymer, in the uncured state, being dispersible in water.

2. A multiple layer composite material according to claim 1, wherein the layer of polymer-bound concrete (2) has a grain structure that prevents the penetration of liquid water to a depth of more than half of the thickness of the layer of polymer-bound concrete, but permits the escape of water from the material.

3. A multiple layer composite material according to claim 1, wherein the layer of polymer-bound concrete (2) has a grain structure that prevents the penetration of liquid water, but permits the escape of water from the material.

4. A multiple layer composite material according to claim 1, wherein it has a polymer layer (7) on the outside surface (6) of the at least one layer of polymer-bound concrete (2).

5. A multiple layer composite material according to claim 1, wherein the polymer is dispersible in water in a ratio of 1:0.7 to 0.7:1.

6. A multiple layer composite material according to claim 1, wherein the total capillary pore volume of the layer of polymer-bound concrete (2) is not more than 6% by volume.

7. A multiple layer composite material according to claim 6, wherein the layer of polymer-bound concrete (2) is substantially free from capillary pores.

8. A multiple layer composite material according to claim 1, wherein the volume percentage of the at least one polymer in the layer of polymer-bound concrete (2) is 4 to 14%.

9. A multiple layer composite material according to claim 1, wherein the layer of cement-bound concrete (1) or the layer of polymer-bound 2 concrete (2) is composed of at least two layers (1, 1'; 2, 2') of different compositions.

10. A multiple layer composite material according to claim 1, wherein it is in the form of a shaped body which is provided on at least one surface thereof with at least one layer of polymer-bound concrete.

11. A multiple layer composite material according to claim 10, wherein the shaped body is a ready-made concrete part, a cladding panel, a curbstone, a paving stone, a path or terrace slab, a pipe or a channel.

12. The multiple layer composite material according to claim 1 wherein the layer of polymer-bound concrete (2) is further composed of concrete admixtures or concrete additives.

13. The multiple layer composite material according to claim 5 wherein the polymer is dispersible in water in a ratio of 1:1.

14. The multiple layer composite material according to claim 8 wherein the volume percentage of the at least one polymer in the layer of polymer-bound concrete (2) is 8 to 13%.

* * * * *